United States Patent
Davis

(10) Patent No.: US 9,205,884 B2
(45) Date of Patent: Dec. 8, 2015

(54) DRIVE DEVICE FOR CRAWLER TRACK VEHICLE

(71) Applicant: FLSmidth A/S, Valby (DK)

(72) Inventor: Glenn Davis, Spokane, WA (US)

(73) Assignee: FLSMIDTH A/S (DK)

( * ) Notice: Subject to any disclaimer, the term of this patent is extended or adjusted under 35 U.S.C. 154(b) by 0 days.

(21) Appl. No.: 14/367,327

(22) PCT Filed: Dec. 27, 2012

(86) PCT No.: PCT/US2012/071773
§ 371 (c)(1),
(2) Date: Jun. 20, 2014

(87) PCT Pub. No.: WO2013/101904
PCT Pub. Date: Jul. 4, 2013

(65) Prior Publication Data
US 2015/0008728 A1    Jan. 8, 2015

Related U.S. Application Data

(60) Provisional application No. 61/581,142, filed on Dec. 29, 2011.

(51) Int. Cl.
| | |
|---|---|
| B62D 55/00 | (2006.01) |
| B62D 55/08 | (2006.01) |
| B62D 55/112 | (2006.01) |
| B62D 55/12 | (2006.01) |
| B62D 55/14 | (2006.01) |
| B62D 55/06 | (2006.01) |

(52) U.S. Cl.
CPC ............... *B62D 55/08* (2013.01); *B62D 55/06* (2013.01); *B62D 55/112* (2013.01); *B62D 55/12* (2013.01); *B62D 55/14* (2013.01)

(58) Field of Classification Search
CPC ........ B62D 55/00; B62D 55/06; B62D 55/08; B62D 55/10; B62D 55/12; B62D 55/14; B62D 55/30
USPC ......... 305/120, 124–125, 127–131, 133–134, 305/143, 145, 155
See application file for complete search history.

(56) References Cited

U.S. PATENT DOCUMENTS

| | | | | |
|---|---|---|---|---|
| 1,336,961 | A * | 4/1920 | Holt | 305/125 |
| 4,129,990 | A | 12/1978 | Valantin | |
| 4,348,138 | A | 9/1982 | Blampain et al. | 405/297 |
| 4,582,367 | A * | 4/1986 | Jacquet et al. | 305/131 |
| 6,547,345 | B2 * | 4/2003 | Phely | 305/124 |
| 7,644,788 | B2 * | 1/2010 | Scheetz | 180/9.5 |
| 2008/0211299 | A1 * | 9/2008 | Wilt | 305/131 |
| 2010/0237691 | A1 | 9/2010 | Busley et al. | |

FOREIGN PATENT DOCUMENTS

GB    1065696 A1    4/1967

OTHER PUBLICATIONS

The International Search Report and Written Opinion dated Feb. 21, 2013, 5 pages.

* cited by examiner

*Primary Examiner* — Jason Bellinger
(74) *Attorney, Agent, or Firm* — Matthew R. Weaver; Aaron M. Pile; Jeffrey A. Sharp

(57) ABSTRACT

A crawler track chassis is motivated by the reciprocating movement of hydraulic cylinder's piston rod.

4 Claims, 7 Drawing Sheets

US 9,205,884 B2

DRIVE DEVICE FOR CRAWLER TRACK VEHICLE

BACKGROUND OF THE INVENTION

This application claims the benefit of U.S. Provisional Application No. 61/581,142, filed Dec. 29, 2011.

FIELD OF INVENTION

This invention relates to drive device for crawler tracks that are used for applications such as supporting and moving very large and heavy conveying equipment such as mobile stacking and spreading conveyors, earth moving equipment such as dozers and mining shovels, crawler mounted cranes, mobile overland hoppers, bucket wheel excavators, tractors, as well as heavy transport machines such as transport crawlers.

BACKGROUND AND DESCRIPTION OF THE PRIOR ART

Generally, the aforementioned machinery is slow moving equipment that typically move at speeds in the range of from 1 m/min to approximately 10 m/min and is used in mining operations to handle various materials. As an example, mobile conveyors are supported on a series of truss frames and crawler tracks assemblies which also serve to move the conveyors at very slow speeds in conjunction with the needs of the mine site. Crawler track assemblies use track drives to maneuver. The track drive is an endless track that has a plurality of track links. A support frame is typically mounted within the interior of the periphery of the endless track with one or more drive wheels or drive sprockets mounted to the frame. The drive sprockets may be driven by means of large planetary drive, which are quite expensive and have a comparatively long delivery time. It is therefore one object of the present invention to provide a different motive force for crawler tracks that does not have the disadvantages of present systems.

BRIEF DESCRIPTION OF THE INVENTION

The above and other objects are realized by the present invention in which the force used to motivate the crawler does not directly motivate the crawler's drive wheels but moves a slide bar on which the drive wheels are attached. In another embodiment of the invention, a hydraulic cylinder is utilized to motivate a crawler track chassis which in turn motivates crawler tracks. In another embodiment of the invention, the crawler track chassis is comprised of a track frame on which there are guide rollers or wheels capable of moving on crawler tracks and a sliding beam on which there is mounted the drive wheel or drive sprocket that engages and moves the crawler tracks. In another feature of the invention the track frame can move independent of the crawler's drive wheel, such as by being slidably engaged with the bar on which the drive wheels are mounted.

DETAILED DESCRIPTION OF THE INVENTION

Figure 1:
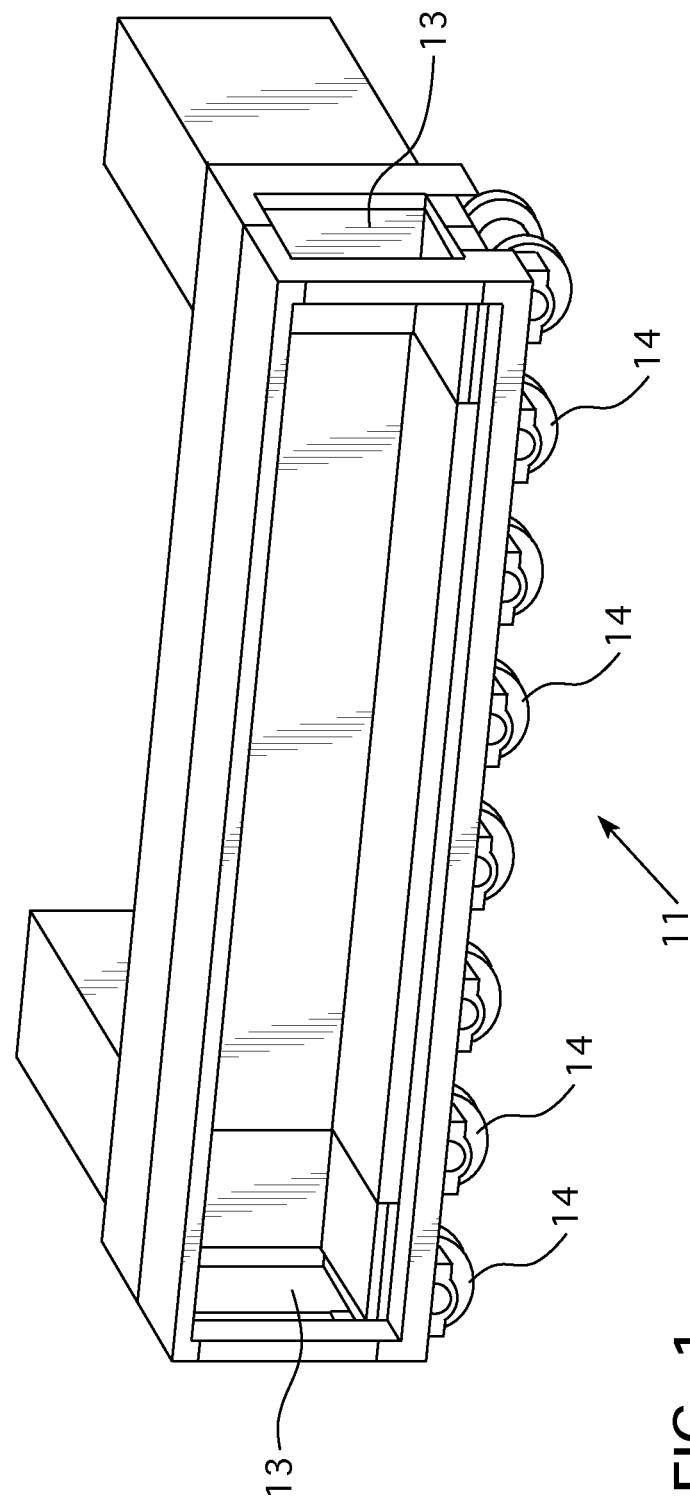
FIG. 1 is a perspective view of a track frame utilized in the crawler track of the present invention.

With reference to FIG. 1, track frame 11 is depicted, having ports 13 for receiving a slide beam, and a plurality of track rollers 14 on the underside of track frame 11 on which track frame rides for engagement with a continuous track.

Figure 2:
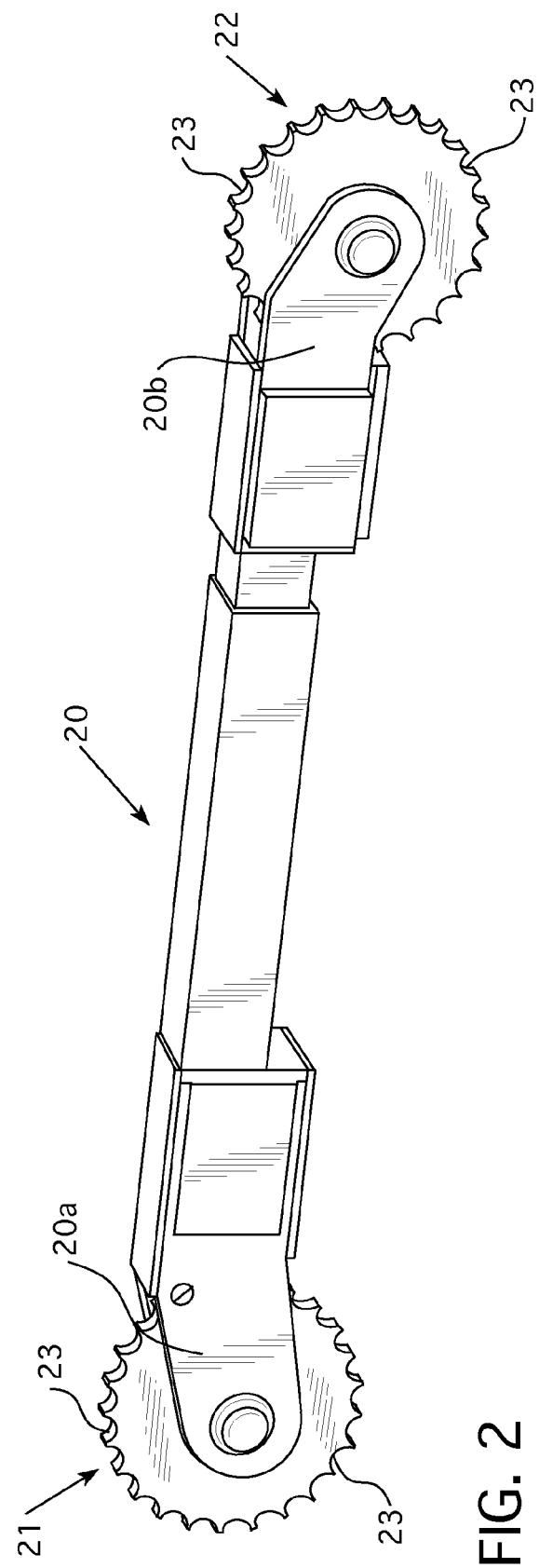
FIG. 2 is a perspective view of a slide beam utilized in the crawler track of the present invention on which drive wheels are mounted.

With reference to FIG. 2, slide beam 20 is depicted having drive wheel 21 located on one end 20a of the slide beam, and idler wheel 22 on opposite end 20b thereof. As depicted drive wheel 21 and, optionally, idler wheel 22 have sprockets 23, which will engage with the continuous crawler track so that when the drive wheel is rotated the continuous crawler track will move.

Figure 3:
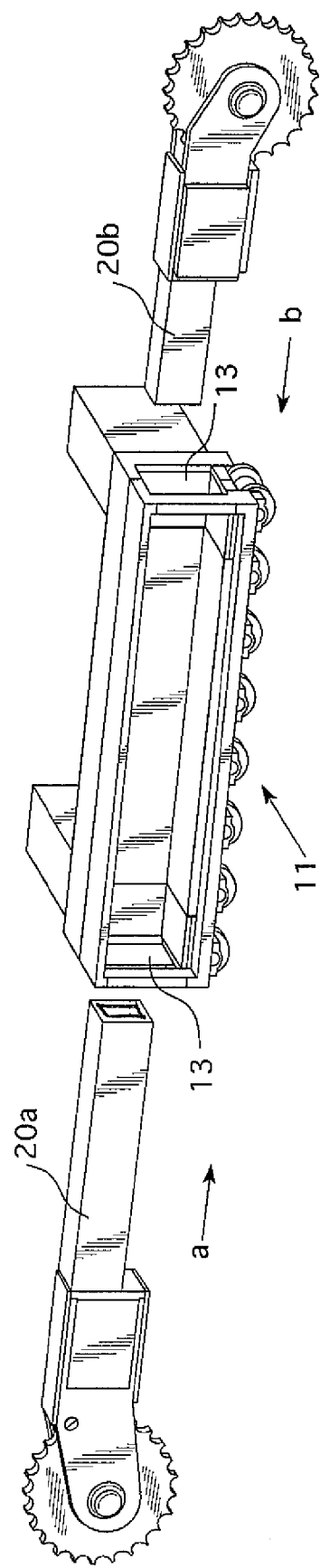
FIG. 3 is a perspective view illustrated one embodiment of the slide beam being engaged with the track frame.

FIG. 3 depicts engaging slide beam 20 with track frame 11. As depicted, sections 20a and 20b of slide beam 20 are inserted longitudinally, in the direction of arrows a and b respectively, through ports 13 located on opposite ends of track frame 11 after which the sections are secured to each other, such as by using a threaded rod and nut assembly. Generally this assembly would be used to tension the chain assembly to take the slack out of the system.

Figure 4:
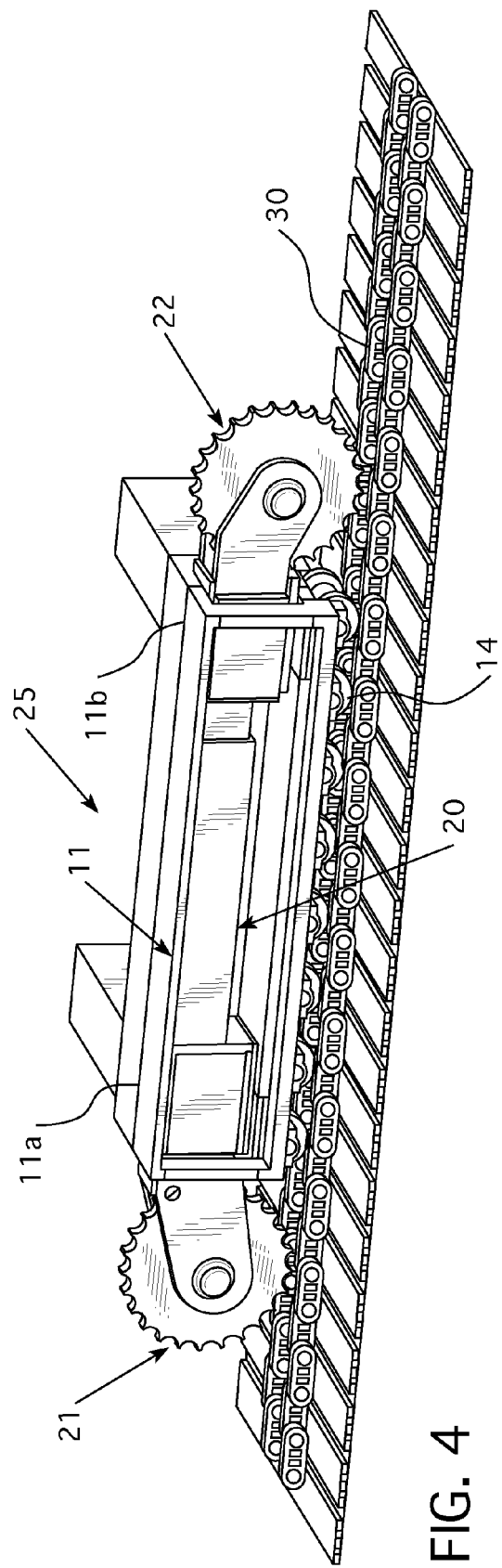
FIG. 4 is a perspective view of a slide beam engaged with a frame, with the resulting structure positioned on top of a crawler track.
Figure 5:
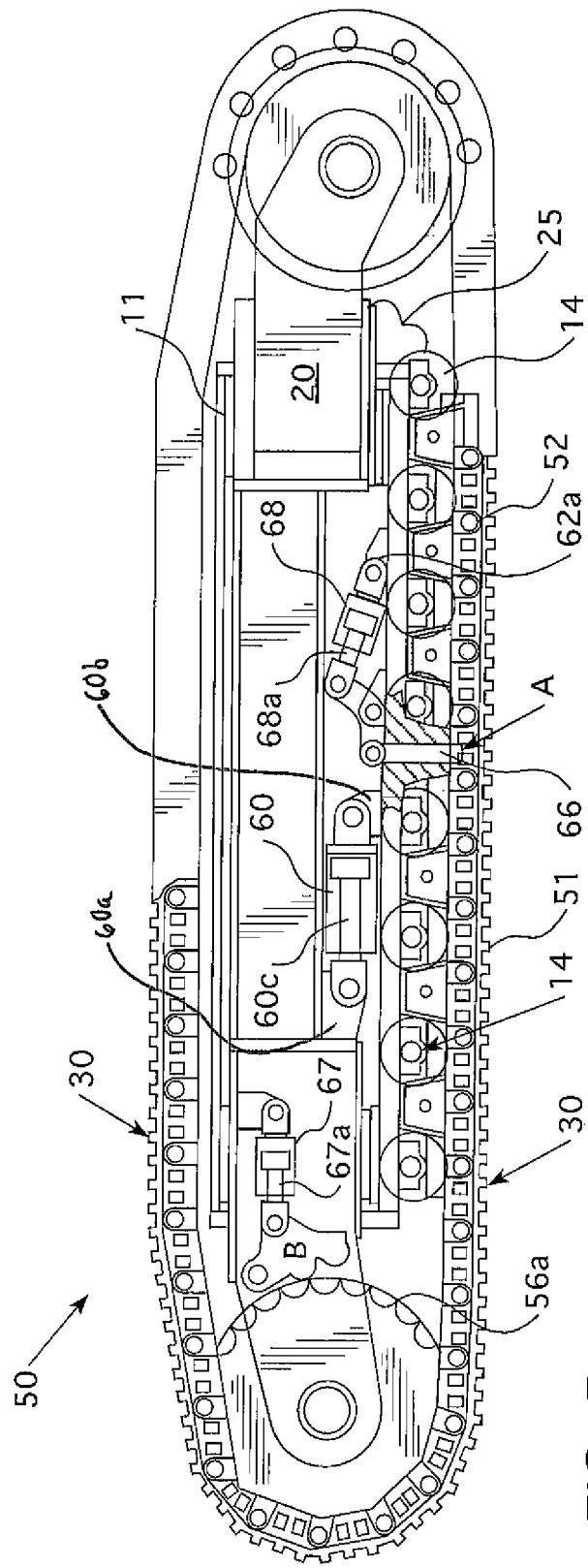
FIGS. 5-7 are longitudinal sectional views showing the sequential operation of a crawler track of the present invention.
Figure 6:
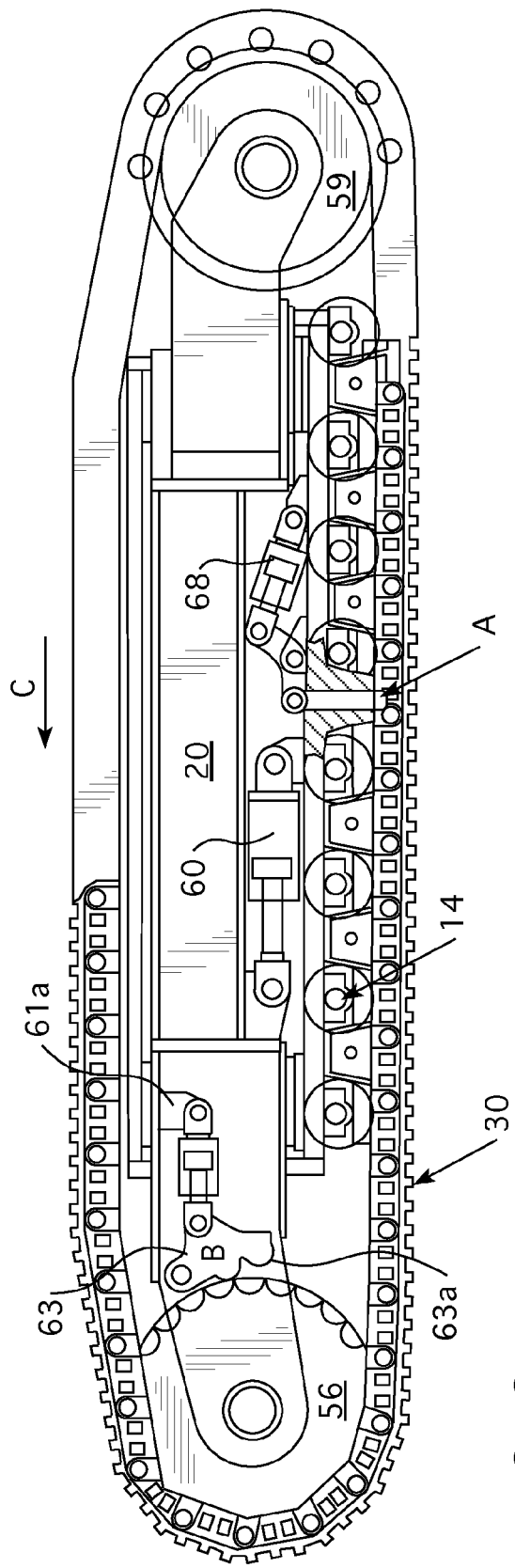
Figure 7:
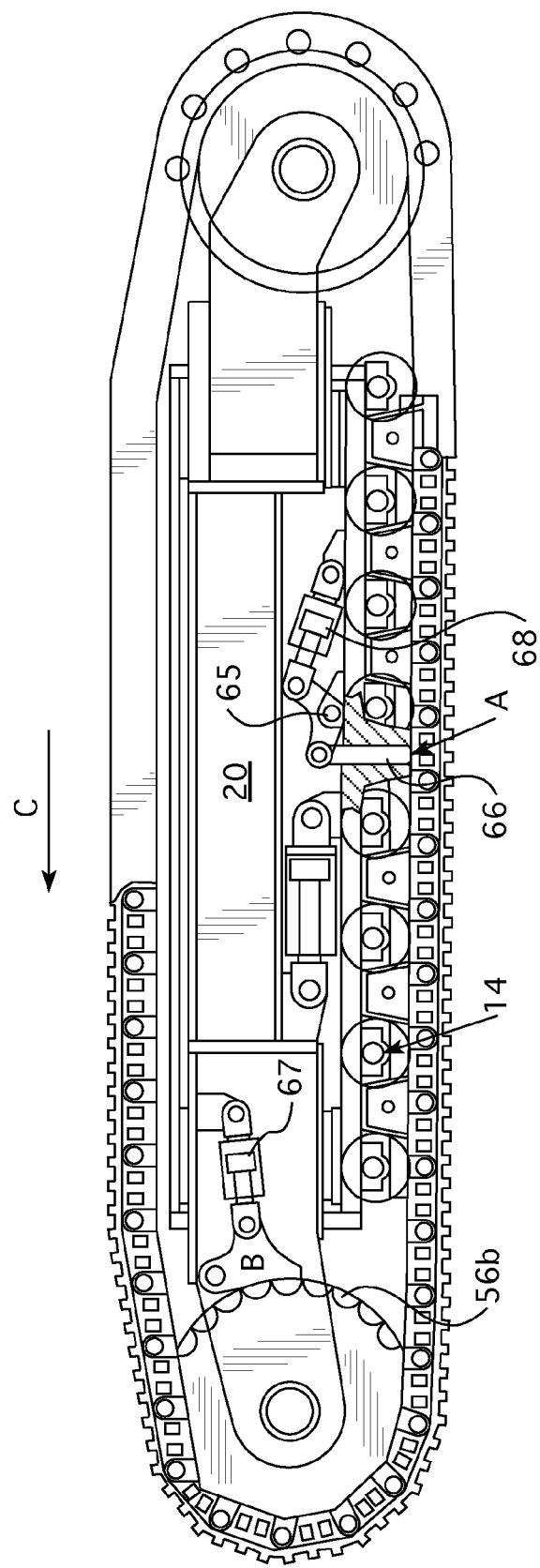

FIG. 4 shows the engagement of slide beam 20 with track frame 11 to form chassis 25, which is positioned adjacent to and above continuous track 30, which in operation will be wrapped around chassis 25, as seen in FIGS. 5-7. While slide beam 20 has been inserted longitudinally within track frame 11, drive wheel 21 is outside of track frame 11 and adjacent to end 11a of track frame 11 and idler wheel 22 is outside of track frame 11 and adjacent to its end 11b. Rollers 14, drive wheel 21, and idler wheel 22 are all movable on continuous track 30, and the sprockets of drive wheel 21 are engaged on the continuous track so that when drive wheel 21 moves the continuous track will move an equivalent distance.

Referring now to FIG. 5, there is shown one embodiment of the present invention, in which indicated at 50 is an individual crawler track assembly utilized, generally in conjunction with one or more similar units, to move heavy equipment. The crawler track assembly 50 is comprised of chassis 25 which is positioned within the periphery of crawler tracks 30 and which in turn is comprised of track frame 11 and slide beam 20. On the underside of track frame 11 there are a plurality of wheels or rollers 14 which in turn are positioned above and adjacent to endless crawler belt 30. In endless crawler belt 30 there are links 51 and connecting members 52 which are typically comprised of bushings and connecting pins and which serve to connect the respective track links 51 to their adjacent members. Connecting members 52 engage between the teeth 56a of the braking sprocket 56, which is adapted for rotational movement and is mounted to one end of sliding beam 20.

Denoted at 59 is an idler wheel adapted for rotational movement which is supported on the other end of sliding beam 20. (Sprocket 56 and idler wheel 59 are collectively referred to herein as the "crawler wheels".) Idler wheel 59 is constantly biased in a direction away from sprocket 56 to impart a suitable degree of tension to the crawler track 30 which is wrapped between and around sprocket 56 and idler wheel 59 and on which wheels 14 ride. Crawler belt 30 encompasses and travels around chassis 25.

Hydraulic cylinder 60 provides the motivating force for crawler track unit 50. Hydraulic cylinder has one end 60a connected to sliding beam 20 and the other end 60b connected to track frame 11.

As indicated, it is a feature of this invention that sliding beam 20 is slidably engaged with track frame 11 such that both track frame 11 and sliding beam 20 (and therefore also the crawler wheels which are attached to sliding beam 20) are capable of moving independent of each other, particularly when braking action is applied to either track frame 11 or sliding beam 20. Accordingly, braking device B, which is attached on one end 61a to sliding beam 20, is designed to engage with sprocket 56 to thereby prevent the movement of sliding beam 20. Braking device A, which is attached on one end 62a to track frame 11, is designed to engage with crawler belt 30 to thereby prevent the movement of track frame 11. As depicted, both braking devices A and B utilize small hydraulic cylinders indicated as, respectively 67 and 68, to move the devices in and out of a braking position, although other means of motivating the devices, such as by being electrically motivated, can be employed. A variety of braking devices can be employed. In the depicted embodiment braking device B has on one end thereof a mating dog 63 containing lobes 63a which are sized to engage with the bottom portions 56b of sprocket 56 to thereby, when thus engaged, prevent the movement of sprocket 56 and accordingly the movement of sliding beam 20. Braking device A is connected on one end thereof via bracket 65 with pin 66 which when engaged will extend into a bushing of the crawler track 30 to thereby prevent the movement of track frame 11.

Typically, a self contained hydraulic power unit (HPU) (comprising reservoir tank, pumps, valves and electronics) are located near the crawler track (or directly mounted to track frame 11. This HPU will be used to automatically power all hydraulic cylinders for the crawler track.

FIGS. 5-7 depict the sequential operation by which crawler track 50 is motivated.

In the position depicted in FIG. 5, piston rod 67a of cylinder 67 is not extended and consequently braking device B is not engaged; rod 60c of main hydraulic cylinder 60 is not extended; and braking device A is engaged by having rod 68a of cylinder 68 extended to thereby force pin 66 to be engaged with crawler track 30. Thus, in the depicted position, track frame 11 is immobile and sliding beam 20 is capable of movement.

In the position depicted in FIG. 6, rod 67a of cylinder 67 remains not extended and consequently braking device B is not engaged; rod 60c of main hydraulic cylinder 60 remains extended; and braking device A remains engaged by having rod 68a of cylinder 68 extended thereby forcing pin 66 to be engaged with crawler track 30.

Comparing the relative positions of the crawling track assembly as depicted in FIG. 5 and FIG. 6, in the position depicted in FIG. 6 hydraulic cylinder 60 has been extended to thereby push sliding beam 20 forward in the direction of arrow C the distance of the cylinder stroke—which in the preferred embodiment would be equivalent to the length of one chain pitch—from the position shown in FIG. 5. As the sprockets 56a are engaged in the continuous track 30 when the sliding beam 20 moves forward the continuous track 30 will likewise move in a counter clockwise direction around the support frame. While this action has taken place track frame 11 will not have moved relative to its position in FIG. 5. It should be notable that there will be sufficient play in crawler belt 30 so that, while it is immobile in the area where pin 66 is engaged, there can be movement in the vicinity of the braking sprocket 56 for moving the length of one chain pitch.

In the position depicted in FIG. 7, rod 67a of cylinder 67 has been extended and consequently braking device B has been engaged to thereby prevent sliding beam 20 from moving; rod 60c of main hydraulic cylinder 60 has been retracted; and rod 68a of cylinder 68 has been retracted, thereby disengaging braking device A by having pin 66 to be removed from its previous engagement with crawler track 30.

Comparing the relative positions of the crawling track assembly as depicted in FIG. 6 and FIG. 7, in the position depicted in FIG. 7 rod 60c of hydraulic cylinder 60 has been retracted to thereby pull track frame forward in the direction of arrow C the distance of the cylinder stroke to thereby place track frame 11 and sliding beam 20 in the same position relative to each other as they were in FIG. 5, with the crawling track assembly in its entirety having moved one cylinder stroke in the direction of arrow C from the position depicted in FIG. 5.

The method of moving the crawler track can be sequentially described as follows:

Step 1—engage the track frame lock and disengage the sliding beam lock;

Step 2—extend the rod of the main hydraulic cylinder, with the sliding beam and crawler wheels being pushed forward;

Step 3—disengage the track frame lock and engage the sliding beam lock;

Step 4—retract the rod of the main hydraulic cylinder, with the track frame being pulled forward; and repeat the above steps.

Thus the crawler track assembly is continuously moved by the reciprocating movement of the rod of a hydraulic cylinder.

Although the present invention has been described with reference to preferred embodiments, workers skilled in the art will recognize that changes may be made in form and detail without departing from the spirit and scope of the invention.

I claim:

1. A crawler track vehicle comprising,
   (a) a track frame having an underside on which there are rollers suitable for movement on a crawler track,
   (b) a slide bar fitted longitudinally within the track frame, the slide bar having on a first end a drive wheel adapted to engage and move an endless crawler track and having on a second end an idler wheel, with both the drive wheel and the idler wheel located longitudinally outside of the track frame, and with the track frame and the slide bar adaptable to move independently of each other; and
   (c) a motivating force means to alternately move the track frame and the slide bar.

2. A crawler track vehicle comprising,
   (a) a track frame having an underside on which there are rollers suitable for movement on a crawler track,
   (b) a slide bar fitted longitudinally within the track frame, the slide bar having on a first end a sprocketed drive wheel adapted to engage and move an endless crawler track and having on a second end an idler wheel, with both the drive wheel and the idler wheel located longitudinally outside of the track frame, and with the track frame and the slide bar adaptable to move independently of each other; and
   (c) an hydraulic cylinder having a piston rod capable of being extended or retracted, with the hydraulic cylinder moving only one of the track frame or the slide bar in a direction when the piston rod is extended and the other one of the track frame or the slide bar in the same direction when the piston rod is retracted.

3. The crawler track of claim 2, wherein said hydraulic cylinder has two ends, with a first end connected to the track frame and a second end connected to the slide bar.

4. The crawler track of claim 2 further comprising braking means to keep (i) the track frame stationary while the slide bar is in motion and (ii) the slide bar stationary while the track frame is in motion.

\* \* \* \* \*